(12) United States Patent
Kitagawa et al.

(10) Patent No.: US 7,888,876 B2
(45) Date of Patent: Feb. 15, 2011

(54) LIGHTING CONTROL FOR VEHICLE LIGHTING DEVICE

(75) Inventors: Takayoshi Kitagawa, Shizuoka (JP); Toru Nakayama, Shizuoka (JP); Yasushi Noyori, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 381 days.

(21) Appl. No.: 12/176,493

(22) Filed: Jul. 21, 2008

(65) Prior Publication Data

US 2009/0026958 A1 Jan. 29, 2009

(30) Foreign Application Priority Data

Jul. 26, 2007 (JP) ............................... 2007-194540

(51) Int. Cl.
  *B60Q 1/26* (2006.01)
  *H05B 41/00* (2006.01)
(52) U.S. Cl. ..................................... 315/80; 315/185 R
(58) Field of Classification Search ............. 315/77–82, 315/224, 209 R, 185 R, 185 S, 312
  See application file for complete search history.

(56) References Cited

U.S. PATENT DOCUMENTS

2009/0072755 A1* 3/2009 Prexl et al. .................. 315/291
2009/0128045 A1* 5/2009 Szczeszynski et al. .. 315/185 R
2009/0187925 A1* 7/2009 Hu et al. ...................... 719/327
2009/0302776 A1* 12/2009 Szczeszynski .............. 315/246
2009/0322234 A1* 12/2009 Chen et al. .................. 315/159

FOREIGN PATENT DOCUMENTS

JP 2006-103477 4/2006

* cited by examiner

*Primary Examiner*—Douglas W Owens
*Assistant Examiner*—Minh D A
(74) *Attorney, Agent, or Firm*—Fish & Richardson P.C.

(57) ABSTRACT

A lighting control device for a vehicle lighting device is arranged so that loads applied to switching regulators are about equal when driving multiple semiconductor light sources (e.g., LEDs) as multifunctional lamps through the switching regulators. The LEDs are divided into two groups. The LEDs belonging to the first group are driven to be turned ON through a first switching regulator and the LEDs belonging to the second group are driven to be turned ON through a second switching regulator. Maximum values of power to be supplied to the LEDs are set to be about equal to each other, and loads to be applied to the switching regulators are about equal to each other.

12 Claims, 4 Drawing Sheets

| LED | 1 | 2 | 3 | 4 | 5 | 6 | 7 | 8 |
|---|---|---|---|---|---|---|---|---|
| | | G1 | | | | G2 | | |
| FUNCTION | LOW | LOW | LOW | HIGH | HIGH | CORNER | TURN | DRL |
| DAY | 0 | 0 | 0 | 0 | 0 | 0 | 10 | 10 |
| NIGHT NORMAL | 10 | 10 | 10 | 10 | 10 | 5 | 10 | 0 |
| LOW SPEED RUNNING | 15 | 10 | 8 | 10 | 10 | 5 | 10 | 0 |
| HIGH SPEED RUNNING | 8 | 10 | 15 | 10 | 10 | 5 | 10 | 0 |

FIG. 4

| LED | 1 | 2 | 3 | 4 | 5 | 6 | 7 | 8 |
|---|---|---|---|---|---|---|---|---|
| | G1 | G2 | G1 | | G2 | | | |
| FUNCTION | LOW | LOW | LOW | HIGH | HIGH | CORNER | TURN | DRL |
| DAY | 0 | 0 | 0 | 0 | 0 | 0 | 10 | 10 |
| NIGHT NORMAL | 10 | 10 | 10 | 10 | 10 | 5 | 10 | 0 |
| LOW SPEED RUNNING | 15 | 10 | 8 | 10 | 10 | 5 | 10 | 0 |
| HIGH SPEED RUNNING | 8 | 10 | 15 | 10 | 10 | 5 | 10 | 0 |

…

LIGHTING CONTROL FOR VEHICLE LIGHTING DEVICE

CROSS-REFERENCE TO RELATED APPLICATION

This application claims priority from Japanese Patent Application JP2007-194540, filed on Jul. 26, 2007. The disclosure of that application is incorporate herein by reference.

TECHNICAL FIELD

The present disclosure relates to lighting control for a vehicle lighting device, and more particularly to lighting control for a vehicle lighting device to control an ON operation of a semiconductor light source constituted by a semiconductor light emitting device.

BACKGROUND

In a lighting device for a vehicle which uses a semiconductor light emitting device such as an LED (Light Emitting Diode) as the light source, a lighting control device for controlling an ON operation of the LED is mounted on the lighting device.

Some lighting control devices include a series regulator connected in series to an LED and controlling a specified current to flow to the LED, and a switching regulator for controlling an output voltage to be applied to the LED corresponding to a control state of the series regulator at a minimum voltage. Even if multiple LEDs are connected in series to, or in parallel with, the switching regulator, the switching regulator can control the output voltage to cause the specified current to flow to each of the LEDs.

In some cases in which an output of the switching regulator is short-circuited or grounded, however, a load of the switching regulator increases, causing a failure as the result of excessive power. In some cases in which the output of the switching regulator is opened as the result of a disconnection, the output voltage is excessively raised in a switching regulator of a flyback type, for example.

Therefore, it has been proposed to control a specified current to flow to a semiconductor light source (LED) through a series regulator, and to provide a switching regulator that controls an output voltage to be applied to the semiconductor light source (LED) at a minimum voltage depending on a control state of the series regulator. An operation of the switching regulator is stopped when an anode side of any semiconductor light source (LED) is grounded and an output side of the switching regulator is short-circuited, resulting in an abnormal drop in the output voltage (see, e.g., Japanese Patent Document JP-A-2006-103477).

An abnormality (if any) generated on the output side of the switching regulator is detected, thereby stopping the operation of the switching regulator to protect the LED. In the case in which each semiconductor light source (LED) is implemented as a multifunctional lamp, for example, a high beam, turn signal, cornering or DRL (Daytime Running Light) lamp, a burden on the power basis increases in the switching regulator. Even if multiple switching regulators are used, the burden on the power basis in one of the switching regulators increases.

SUMMARY

In view of the foregoing problems, the present disclosure describes a device with control to cause a load applied to each of switching regulators to be equal when multiple semiconductor light sources are driven as a multifunctional lamp through the switching regulators.

According to a first aspect, a lighting control device of a vehicle lighting device includes multiple switching regulators for supplying power to multiple semiconductor light sources. The lighting control device includes a switching regulator control portion for controlling output voltages of the switching regulators, and an ON/OFF control portion connected to the semiconductor light sources and serving to control ON/OFF operations of the semiconductor light sources based on communicating information transmitted from an external source. At least two maximum values of power of the switching regulators supplied to the semiconductor light sources are about equal to each other.

Using the lighting control device, it is possible to cause a uniform load to be applied to each of the switching regulators. Consequently, it is possible to prevent or reduce the occurrence of failure of each of the switching regulators.

The semiconductor light sources are divided into multiple groups, and power is supplied from the switching regulators to the semiconductor light sources belonging to the respective groups. It is possible to prevent all of the semiconductor light sources from being turned OFF. Thus, it is possible to contribute to an enhancement in safety.

According to a second aspect the semiconductor light sources are used as headlamps for a vehicle, and the semiconductor light sources connected to at least one of the switching regulators are used as both a light source for day and a light source for night.

According to the second aspect, the semiconductor light source serving as the light source for day and the semiconductor light source serving as the light source for night can be prevented from being turned ON at the same time. Therefore, it is possible to decrease the maximum power supplied from the switching regulator to the semiconductor light source.

According to a third aspect, at least two of the semiconductor light sources are used as light sources for a low beam, and the light sources for a low beam are connected to separate switching regulators.

As compared with the case in which all of the semiconductor light sources for a low beam are connected to the same switching regulator, the use frequency is higher than that in the other semiconductor light sources, and the semiconductor light sources for a low beam which is apt to cause a failure can be divided in two parts and can be thus turned ON. In addition, even if an abnormality is generated in any of the switching regulators, it is possible to maintain an ON operation in a part of the semiconductor light sources for a low beam.

According to a fourth aspect, the semiconductor light sources are implemented by a light source for a low beam and a light source for a high beam. The light source for the low beam and the light source for the high beam are connected to different switching regulators.

As compared with the case in which all of the semiconductor light sources for the low beam and the semiconductor light sources for the high beam are connected to the same switching regulator, the balance of power distribution can be enhanced because the semiconductor light sources having higher consumed power are divided into two parts.

Other features and advantages will be readily apparent from the following detailed description, the accompanying drawings, and the claims.

BEST MODE FOR CARRYING OUT THE INVENTION

Figure 1:
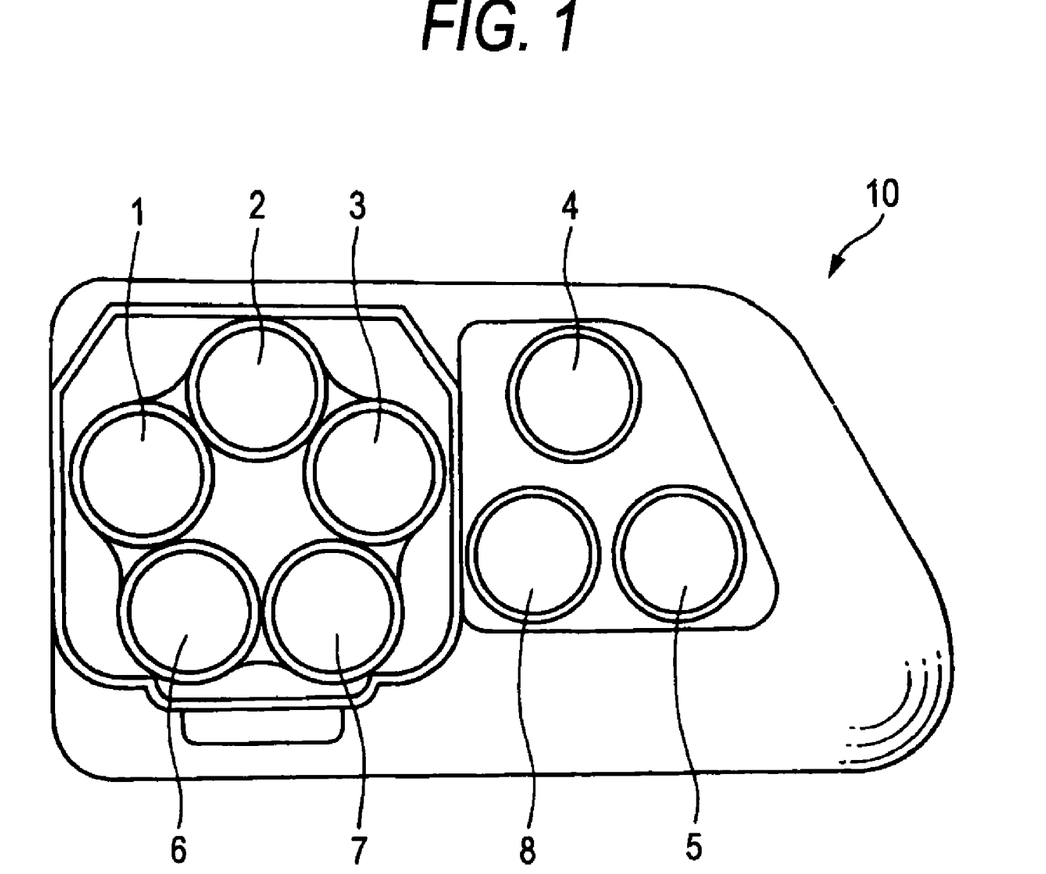
FIG. 1 is a front view showing a vehicle lighting device implemented by a multifunctional lamp.

As shown in the example of FIG. 1, a lighting device for a vehicle (a light emitting device) 10 includes, as a multifunctional lamp, LEDs 1 to 8 constituting, for example, five types of light sources. The LEDs 1 to 3 serve as headlamps for a low beam, the LEDs 4 and 5 serve as headlamps for a high beam, the LED 6 serves as a cornering lamp, the LED 7 serves as a turn signal lamp, and the LED 8 serves as a DRL.

Figure 2:
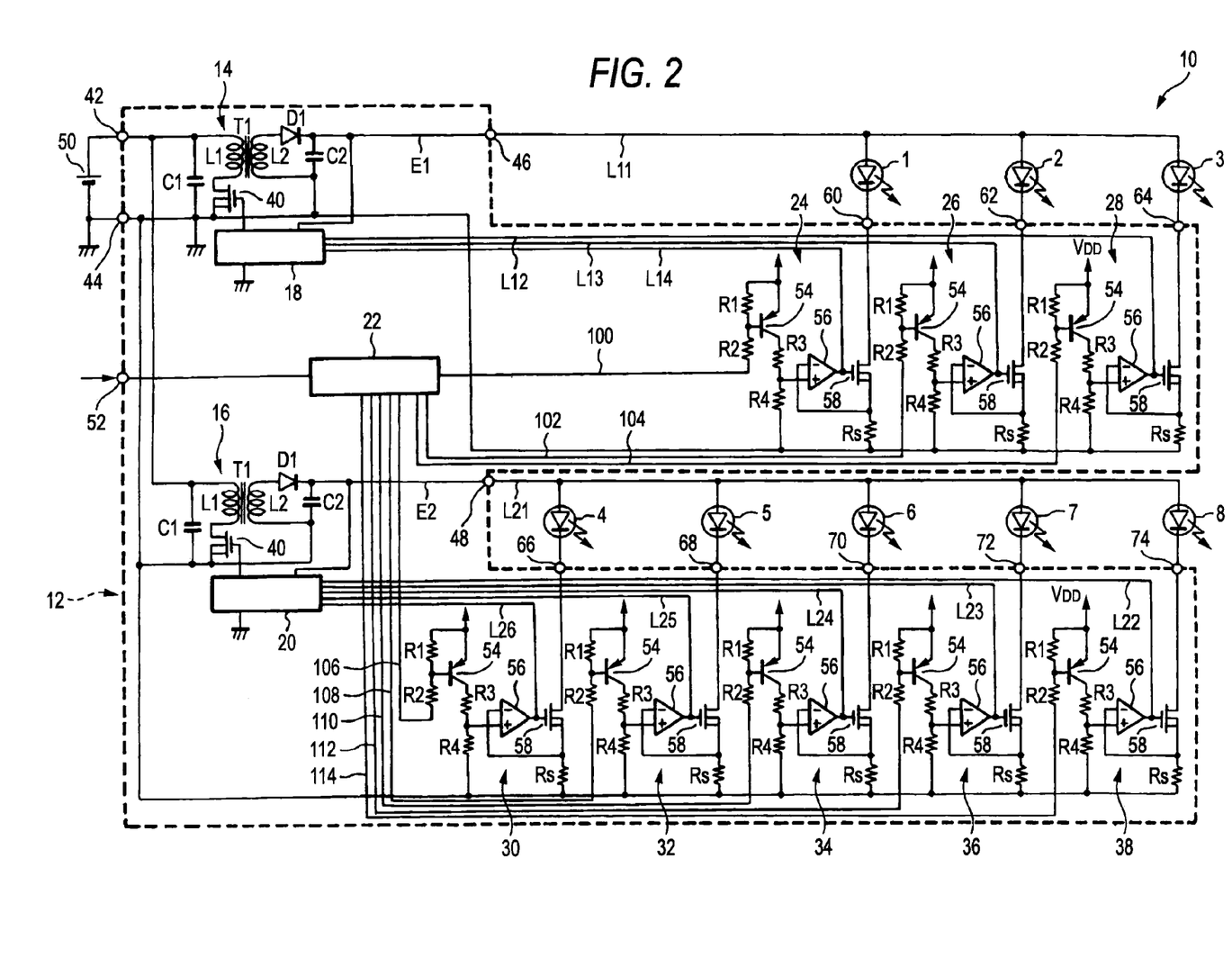
FIG. 2 is a block diagram showing an example of the structure of a lighting control device for the vehicle lighting device.

As shown in FIG. 2, a lighting control device 12 for the vehicle lighting device serves to control an ON operation of the multifunctional lamp and includes a switching regulator 14 for setting the LEDs 1 to 3 as loads, a switching regulator 16 for setting the LEDs 4 to 8 as loads, control circuits 18 and 20 for controlling output voltages of the switching regulators 14 and 16, respectively, an ON/OFF control circuit 22 for generating a control signal to individually turn ON/OFF the LEDs 1 to 8 in response to communicating information transmitted from an outside, and series regulators 24, 26, 28, 30, 32, 34, 36 and 38 connected in series to the LEDs 1 to 8, respectively, and serving to individually regulate currents of the LEDs 1 to 8.

The LEDs 1 to 3 are connected in parallel with each other as semiconductor light sources implemented by semiconductor light emitting devices and are connected in series to the series regulators 24, 26 and 28 at the output side of the switching regulator 14. The LEDs 4 to 8 are connected in parallel with each other as semiconductor light sources implemented by semiconductor light emitting devices and are connected in series to the series regulators 30, 32, 34, 36 and 38 at the output side of the switching regulator 16.

For the LEDs 1 to 8, it is also possible to use multiple LEDs connected in series to each other or multiple LEDs connected in parallel with each other. The LEDs 1 to 8 can be implemented as light sources of various lighting devices for a vehicle, for example, a stop and tail lamp, a fog lamp and a clearance lamp (a small lamp).

The switching regulators 14 and 16 have the same circuit structure and include capacitors C1 and C2, a transformer T1, a diode D1 and an NMOS transistor 40. Both end sides of the capacitor C1 are connected to power input terminals 42 and 44, and a node of the diode D1 and the capacitor C2 is connected to a light source terminal 46 or a light source terminal 48 and a control circuit 18 or a control circuit 20, respectively. The power input terminal 42 is connected to a positive terminal of an on-vehicle battery (DC power supply) 50, and the power input terminal 44 is grounded and is connected to a negative terminal of the on-vehicle battery 50.

Each of the switching regulators 14 and 16 is implemented as an IC (Integrated Circuit), for example. The NMOS transistor 40 is turned ON/OFF in response to switching signals output from the control circuits 18 and 20 having a function of a calculator, for example, switching signals having frequencies of several tens kHz to several hundreds kHz, for example. When the NMOS transistor 40 is turned ON/OFF in response to the switching signal, a DC current flows from the power input terminal 42 to a primary winding L1 of the transformer T1, the NMOS transistor 40, and the power input terminal 44. An AC voltage is generated on both ends of a secondary winding L2 so that an AC current flows to the secondary winding L2. The AC current flowing to the secondary winding L2 is rectified by the diode D1 and is smoothed by the capacitor C2. The smoothed DC current is supplied from the light source terminal 46 to the LEDs 1 to 3, or from the light source terminal 48 to the LEDs 4 to 8.

In the switching regulators 14 and 16, output voltages E1 and E2 are controlled by the control circuits 18 and 20, respectively. Specifically, the control circuit 18 serves as switching regulator control portion to monitor an output voltage E1 of the switching regulator 14 with the voltage E1 of a line L11 and to monitor a control state of each of the series regulators 24, 26 and 28 with voltages of lines L12, L13 and L14, and controls the output voltage E1 at a minimum voltage to be adapted to a voltage of any of three-system series circuits (implemented by the LEDs 1 to 3 and the series regulators 24, 26 and 28) which has the highest voltage based on the voltages of the lines L11 to L14.

Similarly, the control circuit 20 serves as switching regulator control portion to monitor the output voltage E2 of the switching regulator 16 with the voltage E2 of line L21 and to monitor a control state of each of the series regulators 30, 32, 34, 36 and 38 with the voltages of lines L21, L22, L23, L24, L25 and L26, and controls the output voltage E2 at a minimum voltage to be adapted to a voltage of any of five-system series circuits (implemented by the LEDs 4 to 8 and the series regulators 30, 32, 34, 36 and 38) which has the highest voltage based on the voltages of the lines L21 to L26.

The ON/OFF control circuit 22 is implemented by a microcomputer including a CPU (Central Processing Unit), a RAM (Random Access Memory), a ROM (Read Only Memory) and an I/O (Input/Output) interface circuit, for example, and has an input side connected to a vehicle electronic control unit (ECU) through a communicating terminal 52 and a wire harness (not shown).

The ON/OFF control circuit 22 serves as ON/OFF control portion for identifying communicating information for individually turning ON/OFF the LEDs 1 to 8 as external communicating information when the communicating information is provided from the vehicle electronic control unit (ECU), and providing control signals 100, 102, 104, 106, 108, 110, 112 and 114, in accordance with a result of the identification, to the series regulators 24, 26, 28, 30, 32, 34, 36 and 38, respectively.

Control signals 100 to 114 are generated in accordance with the result of the identification for the communicating information. For example, a control signal corresponding to the LED to be turned ON is generated as a signal having a low level, a control signal corresponding to the LED to be turned OFF is generated as a signal having a high level, and a control signal corresponding to the LED to be turned ON with an extinction is generated as an ON/OFF signal having a duty ratio of several tens percent.

On the other hand, each of the series regulators 24 to 38 has an identical circuit structure and includes a PNP transistor 54, an operational amplifier 56, an NMOS transistor 58, a shunt resistor Rs, and resistors R1, R2, R3 and R4. The NMOS transistor 58 serves as a switching device, is connected in series to the shunt resistor Rs, and is connected in series to the LEDs 1 to 8 through light source terminals 60, 62, 64, 66, 68, 70, 72 and 74.

As the switching device, it is also possible to use other types of switching devices, for example, an NPN transistor instead of the NMOS transistor 58.

The shunt resistor Rs serves as a current detecting device for converting current flowing to each of the LEDs 1 to 8 into a voltage and providing the voltage to the negative input terminal of the operational amplifier 56. The operational amplifier 56 obtains a voltage generated on a node of the resistors R3 and R4 at its positive input terminal, obtains a voltage on both ends of the shunt resistor Rs at its negative input terminal, compares both of the voltages, generates a gate voltage (a control signal) corresponding to a result of the comparison, and applies the gate voltage to a gate of the NMOS transistor 58 to control the ON/OFF operations of the NMOS transistor 58.

Specifically, the series regulators 24 to 38 control the ON/OFF operations of the NMOS transistor 58 corresponding to the result of the comparison of the operational amplifier 56, thereby controlling the currents of the LEDs 1 to 8 individually so that a specified current flows to the LEDs 1 to 8.

For example, when the communicating information for turning ON all the headlamps for a low beam is provided as external communicating information from the vehicle electronic control unit (ECU) to the ON/OFF control circuit 22 and signals having a low level are provided as control signals 100, 102 and 104 from the ON/OFF control circuit 22, the PNP transistors 54 of the series regulators 24, 26 and 28 are turned ON. A voltage obtained by dividing a voltage VDD by the resistors R3 and R4 is provided as a reference voltage to the positive input terminal of the operational amplifier 56. At this time, the operational amplifier 56 provides a voltage having a high level to cause a voltage on both ends of the shunt resistor Rs to be coincident with the reference voltage. Consequently, the NMOS transistor 58 is turned ON so that a specified current flows to the LEDs 1 to 3, thereby turning ON the LEDs 1 to 3.

On the other hand, when communicating information for turning OFF all the headlamps for a low beam is provided from the vehicle electronic control unit (ECU) to the ON/OFF control circuit 22 and signals having a high level are provided as the control signals 100, 102 and 104 from the ON/OFF control circuit 22, the PNP transistors 54 of the series regulators 24, 26 and 28 are turned OFF so that a voltage is not applied to the positive input terminal of the operational amplifier 56. For this reason, a voltage having a low level is provided from the operational amplifier 56 so that the NMOS transistor 58 is turned OFF and the LEDs 1 to 3 are turned OFF.

When communicating information for turning ON all the headlamps for a low beam with extinction (dimming) is provided from the vehicle electronic control unit (ECU) to the ON/OFF control circuit 22 and ON/OFF signals having a duty ratio of several tens % are provided as the control signals 100, 102 and 104 from the ON/OFF control circuit 22, the PNP transistors 54 of the series regulators 24, 26 and 28 repeat the ON/OFF operations in response to the ON/OFF signals. Consequently, the high level voltage and the low level voltage are alternately provided from the operational amplifier 56 so that the NMOS transistor 58 repeats the ON/OFF operations. For this reason, the LEDs 1 to 3 carry out the ON operation (with dimming) corresponding to the ON/OFF operations of the NMOS transistor 58.

When communicating information for turning ON all the headlamps for a high beam or a cornering lamp, a turning signal lamp and a DRL is provided from the vehicle electronic control unit (ECU) to the ON/OFF control circuit 22 and signals having a low level are provided as the control signals 106 and 108 or the control signals 110, 112 and 114 from the ON/OFF control circuit 22, the PNP transistors 54 of the series regulators 30 and 32 or the series regulators 34, 36 and 38 are turned ON, and the NMOS transistor 58 is turned ON so that the LEDs 4 and 5 or the LEDs 6 to 8 are turned ON.

When the high level signals are provided as the control signals 106 and 108 or the control signals 110, 112 and 114 from the ON/OFF control circuit 22, the LEDs 4 and 5 or the LEDs 6 to 8 are turned OFF. When the ON/OFF signals having a duty ratio of several tens percent are provided as the control signals 106 and 108 or the control signals 110, 112 and 114 from the ON/OFF control circuit 22, the LEDs 4 and 5 or the LEDs 6 to 8 are turned ON (with dimming).

More specifically, in the ON/OFF control circuit 22, the communicating information transmitted from the vehicle electronic control unit (ECU) is identified, and the control signals 100 to 114 are provided to the series regulators 24 to 38 in accordance with a result of the identification so that the LEDs 1 to 8 can be individually turned ON/OFF and turned ON (with dimming).

In the series regulators 24 to 38, as part of the process for causing a specified current to flow to the LEDs 1 to 3 and the LEDs 4 to 8, the gate voltage of the NMOS transistor 58 is set in the vicinity of a threshold voltage, for example, 2V to 3V. At this time, if the current flowing to one of the LEDs 1 to 3 or the LEDs 4 to 8 is smaller than the specified current, the gate voltage of the NMOS transistor 58 connected to the LEDs 1 to 3 or the LEDs 4 to 8 is raised. If the gate voltage of one of the NMOS transistors 58 is raised (a voltage of one of the lines L12 to L14 or the lines L22 to L26 is raised), the control circuit 18 or 20 controls the ON/OFF operations for the NMOS transistor 58 to raise the output voltage of the switching regulator 14 or 16.

When the gate voltages of all the NMOS transistors 58 connected to the LEDs 1 to 3 or the LEDs 4 to 8 are reduced to be almost equal to the threshold voltage, the switching operation of the NMOS transistor 40 is controlled to lower the output of the switching regulator 14 or 16. Therefore, the switching regulator 14 or 16 can control the output voltage to be in the vicinity of the highest voltage in a variation in Vf (a forward voltage) in the LEDs 1 to 3 or the LEDs 4 to 8.

When power is to be supplied from the switching regulators 14 and 16 to the LEDs 1 to 3 or the LEDs 4 to 8, respectively, a load to be applied to the switching regulators 14 and 16 is distributed uniformly.

For example, in the case in which powers (consumed powers) of the LEDs 1 to 8 are imposed on two switching regulators 14 and 16, it is most efficient that the powers (the consumed powers) of the LEDs 1 to 8 be divided into two parts in view of cost, size and heat (heat radiation).

More specifically, when the powers of the LEDs 1 to 3 to be used for the headlamp for a low beam are imposed on the switching regulator 14 and the powers of the LEDs 4 to 8 to be used in the other lamps are imposed on the switching regulator 16, if the powers (the consumed powers) during the normal use of the LEDs 1 to 8 are 10 W, 10 W, 10 W, 10 W, 10 W, 5 W, 10 W and 10 W, respectively, a power (a maximum value of a total power) to be imposed on the switching regulator 14 is 30 W, and a power (a maximum value of the total power) to be imposed on the switching regulator 16 is 45 W. In that case, a large difference occurs between the powers, and the balance of power is not optimum.

On the other hand, when the powers of the LEDs 1 to 4 are imposed on the switching regulator 14 and the powers of the LEDs 5 to 8 are imposed on the switching regulator 16, the power (the maximum value of the total power) to be imposed on the switching regulator 14 is 40 W, and the power (the maximum value of the total power) to be imposed on the switching regulator 16 is 35 W so that a small difference occurs and the balance of power is improved. In this case, preferably the switching regulators 14 and 16 are designed to provide 40 W of power.

The LEDs 1 to 8 are not always turned ON. The lighting mode of each lamp should be taken into consideration to distribute the powers of the LEDs 1 to 8 into the switching regulators 14 and 16 uniformly.

Figure 3:
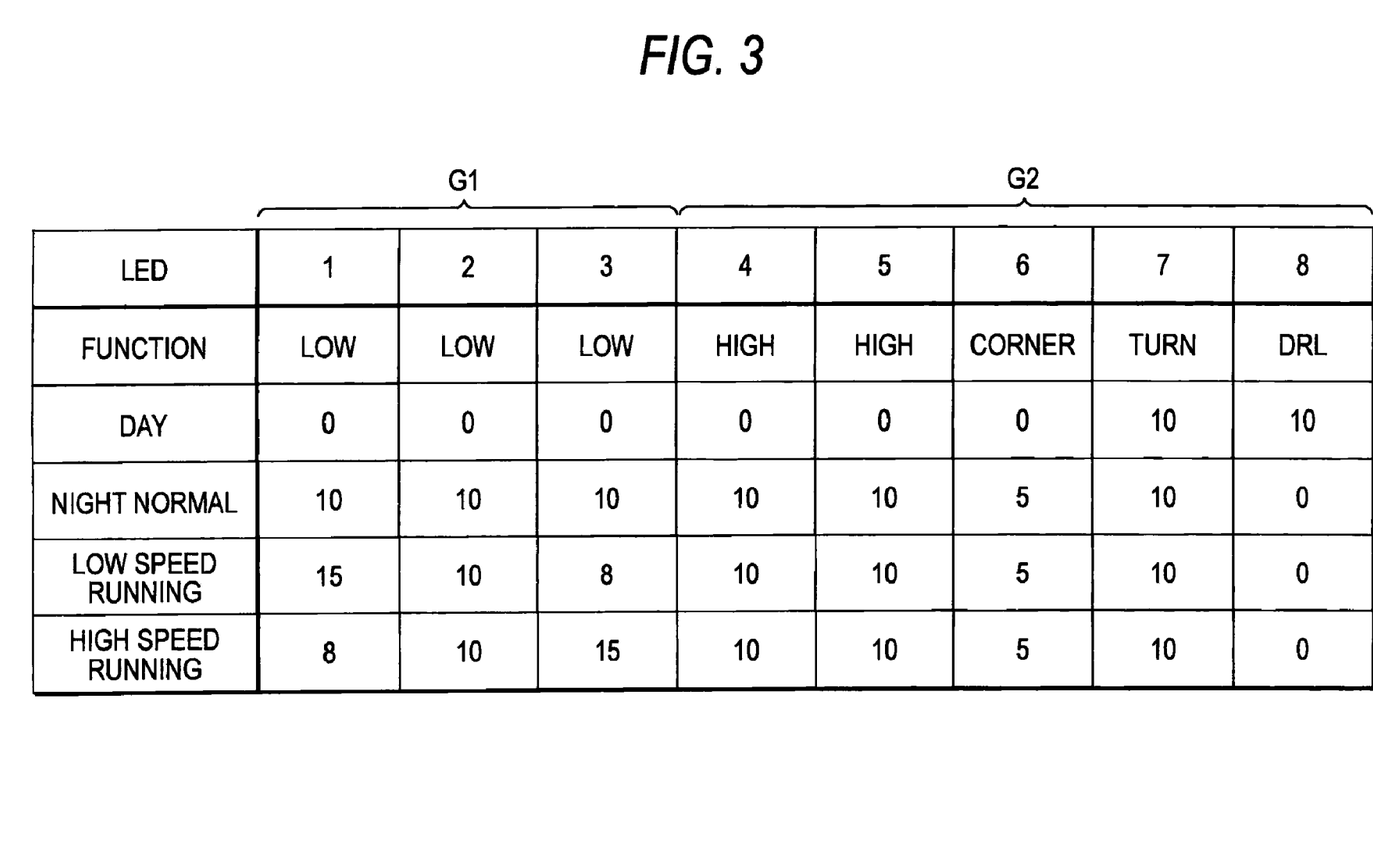
FIG. 3 is a diagram for explaining a relationship between various lighting modes and the power of each LED to be used in a headlamp for a low beam when all the LEDs belong to the same group.

For example, as shown in FIG. 3, the DRL is turned ON during day and is turned OFF when the lamp for a low or high beam is turned ON. In view of the lighting mode in normal operation at night (DRL:OFF), when the powers of the LEDs 1 to 4 are imposed on the switching regulator 14 and the powers of the LEDs 5 to 8 are imposed on the switching regulator 16, the power (the maximum value of the total power) to be imposed on the switching regulator 14 is 40 W and the power (the maximum value of the total power) to be imposed on the switching regulator 16 is 25 W.

In the lighting mode in low speed operation, the power (the maximum value of the total power) to be imposed on the switching regulator 14 is 43 W and the power (the maximum value of the total power) to be imposed on the switching regulator 16 is 25 W. In the lighting mode in high speed operation, the power (the maximum value of the total power) to be imposed on the switching regulator 14 is 43 W, and the power (the maximum value of the total power) to be imposed on the switching regulator 16 is 25 W. More specifically, in both lighting modes, a greater difference between the powers occurs, and the balance is poorer compared to the case in which the lighting mode is not taken into consideration.

When the powers of the LEDs 1 to 3 are imposed on the switching regulator 14 on the assumption that the LEDs 1 to 3 belong to a first group G1 and the powers of the LEDs 4 to 8 are imposed on the switching regulator 16 on the assumption that the LEDs 4 to 8 to be used in the other lamps belong to a second group G2, the power (the maximum value of the total power) to be imposed on the switching regulator 14 is 30 W, and the power (the maximum value of the total power) to be imposed on the switching regulator 16 is 35 W in the lighting mode in the normal running at night. Consequently, a smaller power difference occurs and the balance is improved compared to the case in which the lighting mode is not taken into consideration.

In the lighting mode in low speed operation, the power (the maximum value of the total power) to be imposed on the switching regulator 14 is 33 W and the power (the maximum value of the total power) to be imposed on the switching regulator 16 is 35 W. In the lighting mode in high speed operation, the power (the maximum value of the total power) to be imposed on the switching regulator 14 is 33 W, and the power (the maximum value of the total power) to be imposed on the switching regulator 16 is 35 W.

In this case, in view of each lighting mode, preferably the switching regulators 14 and 16 are designed to be capable of providing the maximum power of 35 W. Compared to the case in which the lighting mode is not taken into consideration, it is possible to use the switching regulators 14 and 16 having a lower power output capability, and the sizes of the switching regulators 14 and 16 can be reduced.

To enhance operational safety, in the lighting mode in the low speed operation, the LED 2 in the headlamp for a low beam is normally turned ON, the LED 3 is turned ON (with dimming), and the LED 1 is turned ON (with an increase) to enhance visibility in proximity to the vehicle. On the other hand, in the lighting mode in the high speed operation, the LED 2 in the headlamp for a low beam is normally turned ON, the LED 3 is turned ON (with an increase), and the LED 1 is turned ON (with dimming) to enhance visibility further away from the vehicle.

While three LEDs and five LEDs are used as the LEDs acting as the loads of the switching regulators 14 and 16, respectively in the foregoing example, it also is possible to use one LED when the same type of LED is set to be the load. For example, an LED for a high power of 30 W also can be used as the LED in the headlamp for a low beam. Multiple LEDs are not always required.

When an LED, which individually does not need to be turned ON/OFF or dimmed, is added as a lamp other than the multifunctional lamp (e.g., when multiple LEDs having a total power (a consumed power) of 50 W is added), it is not necessary to use a switching regulator for turning ON the LED to be added and which is adapted to the output power (35 W) of the switching regulators 14 and 16. Furthermore, it is possible to use a switching regulator capable of providing the necessary power (50 W) for turning ON the LED to be added.

In this case, it is sufficient that a switching regulator having an output of 50 W is provided as a third switching regulator, the added LEDs are connected in series to each other, and power is supplied from the switching regulator having an output of 50 W to the added LEDs. Compared to the case in which the output powers of the switching regulators 14 and 16 and the third switching regulator are distributed to be almost equal to each other in view of the collective power of the LEDs (i.e., LEDs 1 to 8 and the added LED), the number of the series regulators can be reduced so that cost and size advantages can be obtained.

More specifically, referring only to the switching regulators 14 and 16 requiring the function of turning ON/OFF and dimming the LEDs in the vehicle lighting device, it is sufficient that the powers to be imposed on the switching regulators 14 and 16 (the maximum value of the total power) be set to be almost equal to each other, for example, 35 W.

According to the foregoing example, the maximum values of the powers to be supplied to the LEDs 1 to 8 of the switching regulators 14 and 16 (the maximum values of the powers to be imposed on the switching regulators 14 and 16) are set to be almost equal to each other. Therefore, the loads to be applied to the switching regulators 14 and 16 are about equal to each other, and failure of the switching regulators 14 and 16 can be prevented.

The LEDs 1 to 8 are divided into the two groups. The LEDs 1 to 3 belonging to the first group G1 are driven to be turned ON through the switching regulator 14, and the LEDs 4 to 8 belonging to the second group G2 are driven to be turned ON through the switching regulator 16. Therefore, it is possible to prevent all of the LEDs from being turned OFF, resulting in improved operational safety.

LEDs 1 to 3 to be used in the headlamp for a low beam and LEDs 4 and 5 to be used in the headlamp for a high beam are connected to the different switching regulators 14 and 16. Compared to the case in which LEDs 1 to 5 are connected to the same switching regulator, the balance of power distribution can be improved because LEDs 1 to 5 having the high consumed powers are divided into two groups.

In the example, when the LEDs 1 to 8 are to be used as vehicle headlamps, LEDs 4 to 7 connected to the switching regulator 16 are used at night, and LED 8 connected to the switching regulator 16 is used during day. Both LEDs 4 to 7 and LED 8 are not turned ON at the same time. Therefore, it is possible to decrease the maximum values of the powers (the maximum powers) to be supplied to LEDs 4 to 8 of the switching regulator 16.

Figure 4:
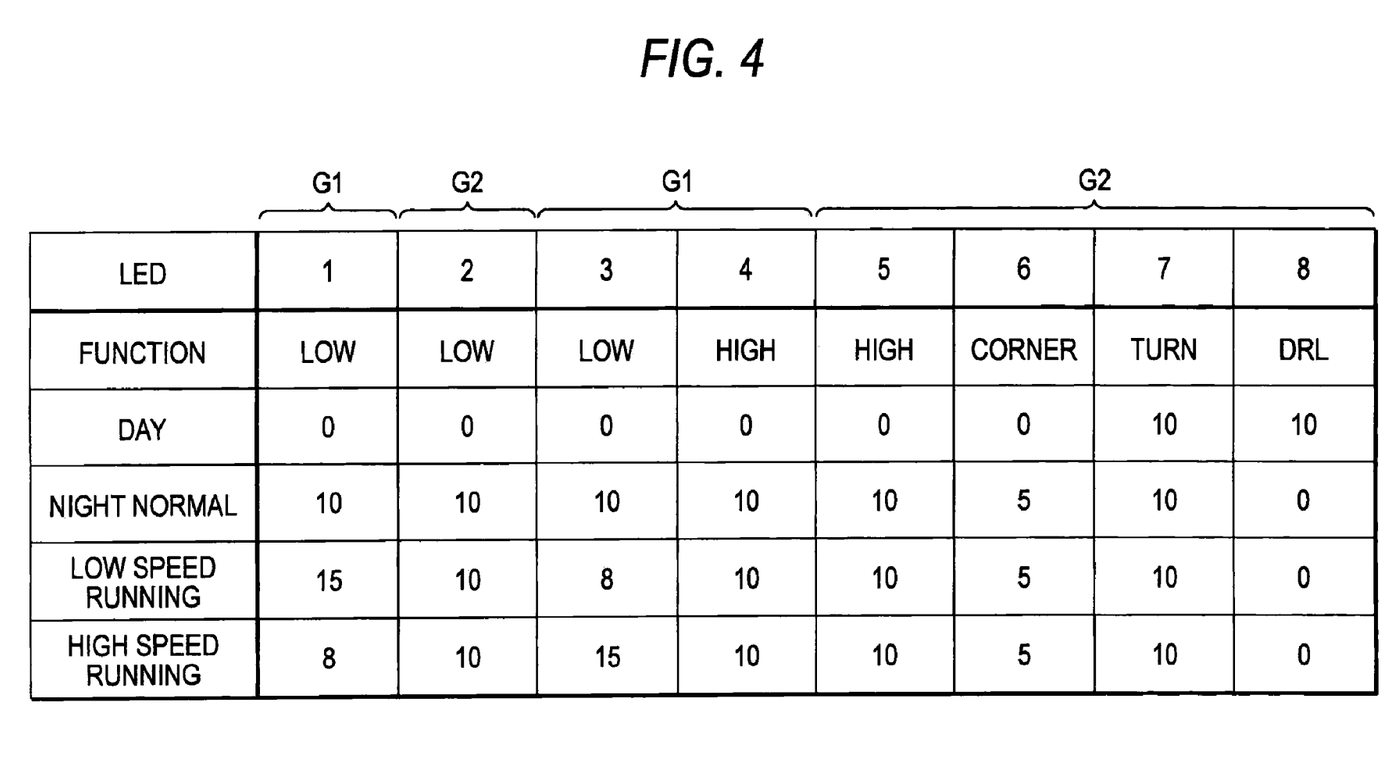
FIG. 4 is a diagram for explaining a relationship between various lighting modes and the power of each LED to be used in a headlamp for a low beam when the LEDs are divided into two groups.

Next, a second example is described with reference to FIG. 4. In the example, in order to avoid interfering with safe operation (e.g., to avoid a situation in which wirings on anode sides of LEDs 1 to 3 are grounded so that all headlamp (LEDs 1 to 3) for a low beam are turned OFF when the headlamps (LEDs 1 to 3) for a low beam turned ON), the LED 2 is replaced with another LED 4. The other structures are the same as in the first example.

More specifically, LED 1 and LEDs 3 and 4 are set to belong to a first group G1, and powers of the LED1 and the LEDs 3 and 4 are imposed on a switching regulator 14. LED 2 and LEDs 5 to 8 are set to belong to a second group G2 and powers of the LED2 and the LEDs 5 to 8 are imposed on the switching regulator 16.

In this case, in a lighting mode in normal operation at night, the power (a maximum value of a total power) to be imposed on the switching regulator 14 is 30 W and the power (a maximum value of a total power) to be imposed on the switching regulator 16 is 35 W. Compared to the case in which the lighting mode is not taken into consideration, a smaller power difference, occurs and the power balance can be improved.

In a lighting mode in low speed operation, the power (the maximum value of the total power) to be imposed on the switching regulator 14 is 33 W, and the power (the maximum value of the total power) to be imposed on the switching regulator 16 is 35 W. In a lighting mode in high speed operation, the power (the maximum value of the total power) to be imposed on the switching regulator 14 is 33 W, and the power (the maximum value of the total power) to be imposed on the switching regulator 16 is 35 W.

In this case, in view of each lighting mode, preferably the switching regulators 14 and 16 are designed to be capable of providing the maximum power of 35 W. Compared to the case in which the lighting mode is not taken into consideration, it is possible to use the switching regulators 14 and 16 having lower power output capability, and the sizes of the switching regulators 14 and 16 can be reduced.

In the example, the maximum values of the powers to be supplied to the LEDs 1 to 8 of the switching regulators 14 and 16 (the maximum values of the powers to be imposed on the switching regulators 14 and 16) are set to be almost equal to each other. Therefore, the loads to be applied to the switching regulators 14 and 16 can be about equal to each other, and failures of the switching regulators 14 and 16 can be prevented.

In the example, LEDs 1 and 3 serving as the headlamps for a low beam are connected to the switching regulator 14, and LED 2 serving as the headlamp for a low beam is connected to the switching regulator 16. Therefore, the headlamps for the low beam, which have higher use frequencies than those of the other lamps and are apt to fail, can be divided into two groups and can be thus turned ON. In addition, even if an abnormality is caused by grounding in either of the switching regulators 14 and 16, it is possible to maintain part of the headlamps for a low beam to be turned ON and to maintain safe operation to some degree.

Furthermore, general operation at night is carried out by turning ON only the headlamp for a low beam in many cases. Therefore, a thermal burden can be distributed to the two switching regulators 14 and 16.

It is also possible to provide a structure in which, when an abnormality is generated in one of the two switching regulators 14 and 16, all (or some) of the LEDs connected to the other switching regulator are turned ON so that safe operation can be ensured and a warning of the abnormality is provided.

Other implementations are within the scope of the claims.

What is claimed is:

1. A lighting control device of a vehicle lighting device, the lighting control device comprising:
a plurality of switching regulators for supplying power to semiconductor light sources;
a switching regulator control portion for controlling output voltages of the switching regulators; and
an ON/OFF control portion connected to the semiconductor light sources and arranged to control ON/OFF operations of the semiconductor light sources based on communicating information transmitted from an external source,
wherein at least two maximum values of power of the switching regulators supplied to the semiconductor light sources are about equal to each other.

2. The lighting control device according to claim 1, wherein the semiconductor light sources serve as headlamps for a vehicle, and the semiconductor light sources connected to at least one of the switching regulators serve as light sources both for day and night.

3. The lighting control device according to claim 2, wherein at least two of the semiconductor light sources serve as light sources for a low beam, and the light sources for the low beam are connected to separate switching regulators.

4. The lighting control according to claim 2, wherein the semiconductor light sources comprise a light source for a low beam and a light source for a high beam, and
the light source for the low beam and the light source for the high beam are connected to different switching regulators.

5. The lighting control device according to claim 1, wherein at least two of the semiconductor light sources serve as light sources for a low beam, and the light sources for the low beam are connected to separate switching regulators.

6. The lighting control according to claim 1, wherein the semiconductor light sources comprise a light source for a low beam and a light source for a high beam, and
the light source for the low beam and the light source for the high beam are connected to different switching regulators.

7. The lighting control device according to claim 1, wherein each of the semiconductor light sources has a plurality of settings.

8. The lighting control device according to claim 7, wherein the semiconductor light sources comprise first and second groups of semiconductor light sources, and wherein the available settings of the first group are limited based on the settings of the second group.

9. The lighting control device according to claim 1 further comprising an additional semiconductor light source having a single setting, wherein the additional light source is connected to an additional switching regulator whose maximum power output does not match the maximum power values of the other switching regulators.

10. The lighting control device according to claim 1, wherein the switching regulators comprise first and second groups of switching regulators, and wherein, if a voltage abnormality is generated by the first group of switching regulators, at least some of the semiconductor light sources connected to the second group of switching regulators switch to a safe operation mode.

11. The lighting control device according to claim 10 further comprising means for generating a warning when the abnormality occurs.

12. The lighting control device according to claim 1 further comprising means for preventing the semiconductor light sources from being turned OFF.

* * * * *